United States Patent Office 3,567,357
Patented Mar. 2, 1971

3,567,357
DYESTUFF PREPARATIONS FOR THE DYEING OF SYNTHETIC POLYAMIDE OR POLYURETHANE FIBROUS MATERIALS
Edwin Baier, Frankfurt am Main, Günter Kaufmann, Kelkheim, Taunus, and Rudolf Löwenfeld, Buschschlag, Germany, assignors to Farbwerke Hoechst Aktiengesellschaft vormals Meister Lucius & Bruning, Frankfurt am Main, Germany
No Drawing. Filed May 14, 1968, Ser. No. 728,875
Claims priority, application Germany, Nov. 21, 1967, F 54,082
Int. Cl. C09b 27/00, 29/20
U.S. Cl. 8—41                            2 Claims

ABSTRACT OF THE DISCLOSURE

Dyestuff preparations for the dyeing of polyamide or polyurethane fibrous materials, characterized by a content of 20–45% by weight of the red azo dyestuff of the formula

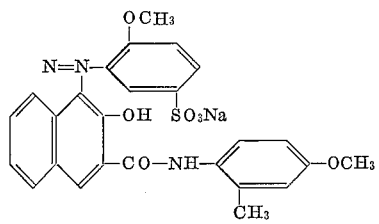

0.5–5% by weight of an alkali metal halide, preferably sodium chloride, and 50–79.5% by weight of an inert, organic, nonionogenic, water-soluble compound, preferably sucrose, serving as an extender.

---

The present invention provides water-soluble dyestuff preparations for the dyeing of polyamide or polyurethane fibrous materials. These dyestuff preparations are characterized by a content of 20–45% by weight of the red azo dyestuff of the Formula I.

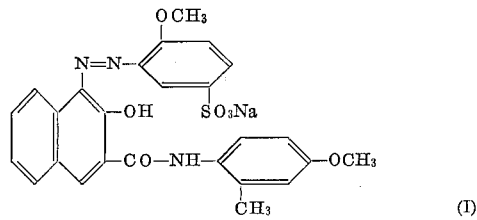

(I)

0.5–5% by weight of an alkali metal halide, preferably sodium chloride, and 50–79.5% by weight of an inert, organic, nonionogenic, water-soluble compound serving as extender.

The preparations of the above-mentioned composition are water-soluble and are suitable for the dyeing of polyamide or polyurethane fibrous materials; when applied onto the said fibrous materials, they give even, intense bluish-red dyeings that have good fastness to wetting and to light.

The present invention is based on the surprising discovery that the dyestuff of the above Formula I is water-soluble in form of the described preparation, whereas it is known from German patent specification 955,858 that the azo-dyestuffs of very similar structure.

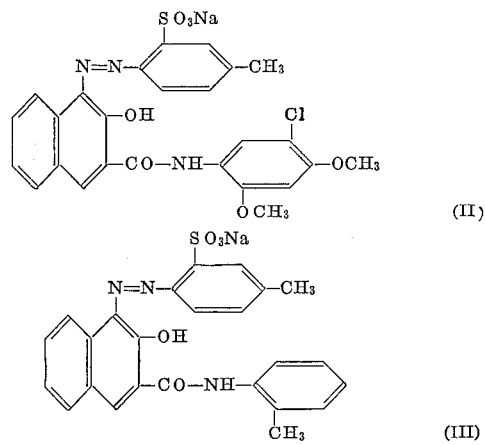

described in the said specification as being suitable for the dyeing of polyamide or polyurethane fibres, are water-insoluble or almost water-insoluble and can therefore only be used as dispersion dyestuffs for the said purpose. The particular technical advantage of the dyestuff preparation of the present invention thus resides in its water-solubility, which makes it possible to dye the afore-mentioned fibrous materials with the dyestuff of Formula I from the aqueous solution.

As an inert, organic, nonionogenic, water-soluble compounds which serve as extenders, there may be mentioned, for example, dextrin, glucose, pentaerythritol, urea, thiourea, and especially sucrose.

The dyeing preparations of the present invention may be prepared by diazotizing in known manner, between about 0° and 5° C., 1-amino-2-methoxybenzene-5-sulfonic acid, coupling the resulting diazonium salt with 1-(2'-hydroxy-3'-naphthoylamino) - 2 - methyl - 4 - methoxybenzene at temperatures in the range of from about 15° to 20° C. and in the pH range of from 6 to 8, isolating the resulting azo dyestuff with the aid of as small an amount of alkali metal halide, preferably sodium chloride, as possible and finally blending the dyestuff with a quantity of inert organic extender, preferably cane sugar, such that the amount of the latter in the preparation is 50–79.5% by weight.

Before isolating the azo dyestuff after coupling, care is to be taken that the coupling mixture, from which the azo dyestuff is to be isolated, contains the alkali metal halide in a concentration of 25–40 g./l. If the concentration of the alkali metal halide is smaller, the dyestuff is obtained in such a finely divided form that it can be isolated by filtration with difficulty only. A higher salt concentration, on the other hand, has a disadvantageous effect on the solubility of the preparation.

The isolated azo dyestuff, which should contain the alkali metal halide in a quantity of 2 to 10% by weight is then mixed either in the wet state in a kneader or, after drying, in a mill with the inert organic extender, preferably sucrose.

The dyeing preparations manufactured in the same manner using the known azo dyestuffs of Formulae II and III mentioned above are not sufficiently water-soluble as compared with the preparation manufactured in accordance with the present invention.

The following examples illustrate the invention, but they are not intended to limit it thereto:

EXAMPLE 1

(A) 220 parts by weight (92.1% strength=1 mol) of 1-amino-2-methoxy-benzene-5-sulfonic acid were dissolved at room temperature in 1000 parts by volume of water and 100 parts by volume of a sodium hydroxide solution having a strength of 33% by weight. The whole was combined with 135 parts by volume of a sodium nitrite solution having a strength of 40% by weight and the resulting solution was allowed to run into a mixture of 2000 parts by weight of ice and 320 parts by volume of hydrochloric acid having a strength of 30%.

The whole was stirred for 20 minutes, the excess nitrous acid was removed by means of amidosulfonic acid and the mixture was filtered. 590 parts by volume of a sodium hydroxide solution having a strength of 6.5% by weight were slowly added, at 0–5° C., while stirring vigorously, whereby the pH-value was adjusted to 6. Then, a solution of 323 parts by weight (96% strength=1.01 mol) of 1 - (2'-hydroxy-3'-naphthoylamino)-2-methyl-4-methoxybenzene in 2420 parts by volume of sodium hydroxide solution having a strength of 2.4% was introduced, simultaneously with a solution of hydrochloric acid having a strength of 7%, into the diazo solution prepared as described above, the introduction being effected in such manner that a pH-value of between 6 and 7 was maintained during the coupling reaction. During this reaction, the temperature should not exceed 20° C.

When coupling was complete, the whole was made up with water to 10,000 parts by volume, heated to 80° C., combined at this temperature with 35 parts by weight of sodium chloride, stirred for 1 hour at 80° C. and filtered with suction.

(B) Filtration with suction was carried out until a wet weight of 1630 parts by weight was reached, the resulting dyestuff press cake was dried at 80° in a vacuum drying chamber and mixed with 760 parts by volume of sucrose in a mill.

1315 parts by weight of a water-soluble red dyestuff preparation were obtained which consisted of 40% by weight of dyestuff of the Formula I, of 2% by weight of sodium chloride and of 58% by weight of sucrose.

(C) If the dyestuff prepared according to (A) was suction-filtered much more intensively, i.e., to a wet weight of only 1020 parts by weight, then dried and mixed with 780 parts by weight of sucrose, a preparation was obtained which contained 40% by weight of dyestuff, 1% by weight of sodium chloride and 59% by weight of cane sugar.

(D) If the dyestuff prepared according to (A) was suction-filtered to a wet weight of 1020 parts by weight, then dried and ground with 2090 parts by weight of cane sugar, a preparation was obtained which consisted of 20% by weight of dyestuff of Formula I, 0.5% by weight of sodium chloride and 79.5% by weight of sucrose.

All three preparations (B, C and D) were well water-soluble and were found to be suitable for the dyeing of polyamide and polyurethane fibrous materials. On the mentioned fibrous materials, they gave a bluish red dyeings having good fastness to wetting and to light.

EXAMPLE 2

220 parts by weight (92.1% strength=1 mol) of 1-amino-2-methoxybenzene-5-sulfonic acid were introduced into a mixture of 300 parts by volume of water and 265 parts by volume of hydrochloric acid having a strength of 30% and the whole was stirred for 1 hour at room temperature and then combined with 2000 parts by weight of ice. Finally, 140 parts by volume of a sodium nitrite solution having a strength of 40% by weight were allowed to run in during 30 minutes. The whole was stirred for 45 minutes at 0–5° C., the excess nitrous acid was removed by means of amidosulfonic acid and the diazo solution was rendered neutral, at 0–5° C., by slow addition of 750 parts by volume of a binormal sodium hydroxide solution. A solution of 323 g. (96% strength=1 mol) of 1 - (2'-hydroxy-3'-naphtholylamino)-2-methyl-4-methoxybenzene in 1700 parts by volume of water and 700 parts by volume of a binormal sodium hydroxide solution were then allowed to run slowly, at 15° C., into the diazo solution thus prepared. The pH-value was maintained at between 7 and 8 by simultaneous addition of binormal hydrochloric acid. When coupling was complete, the mixture was made up with water to 8000 parts by volume, heated to 80° C. and then 145 parts by weight of sodium chloride were scattered in. The mixture was stirred for 1 hour at 80° C., filtered with suction until the product had a wet weight of 2085 parts by weight, the press cake was mixed with 580 parts by weight of sucrose in a kneader and dried at 80° C. in a vacuum drying chamber. 1165 parts by weight of a red dyestuff preparation were obtained which consisted of 45% of dyestuff of the Formula I, 5% of sodium chloride and 50% of cane sugar.

The preparation was found to be easily soluble in water and to dye polyamide and polyurethane fibrous materials intense bluish-red shades having good fastness to wetting and to light.

What we claim is:

1. Dyestuff preparations for the dyeing of synthetic polyamide or polyurethane fibrous materials, characterized by a content of 20–45% by weight of the red azo dyestuff of the Formula I

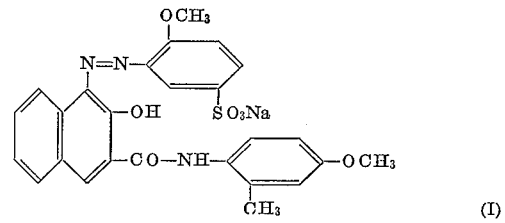

(I)

0.5–5% by weight of an alkali metal halide, and 60–79.5% by weight of an inert, organic, non-ionogenic, water-soluble compound as an extender for the dyestuff.

2. The dyestuff preparation according to claim 1 wherein the nonionogenic compound is sucrose.

References Cited

FOREIGN PATENTS 955,858    1/1957    Germany.

CHARLES E. VAN HORN, Primary Examiner

P. C. IVES, Assistant Examiner

U.S. Cl. X.R.

260—204; 8—173, 79